(12) United States Patent
Binding et al.

(10) Patent No.: US 7,723,101 B2
(45) Date of Patent: May 25, 2010

(54) AEROBIC WASTE TREATMENT SYSTEM

(75) Inventors: Markus Binding, Gruenbach (DE); Jan Gressmann, Bockhorn (DE)

(73) Assignee: COMP-ANY GmbH, Grunbach (DE)

( * ) Notice: Subject to any disclaimer, the term of this patent is extended or adjusted under 35 U.S.C. 154(b) by 485 days.

(21) Appl. No.: 10/599,165

(22) PCT Filed: Mar. 22, 2005

(86) PCT No.: PCT/EP2005/003055

§ 371 (c)(1),
(2), (4) Date: Aug. 20, 2007

(87) PCT Pub. No.: WO2005/092819

PCT Pub. Date: Oct. 6, 2005

(65) Prior Publication Data

US 2008/0050806 A1    Feb. 28, 2008

(30) Foreign Application Priority Data

Mar. 22, 2004  (GB) ................................ 0406347.5

(51) Int. Cl.
   *C12M 1/00*    (2006.01)
(52) U.S. Cl. ............... 435/290.1; 435/290.2; 435/290.4
(58) Field of Classification Search .............. 435/290.1, 435/290.2, 290.4
   See application file for complete search history.

(56) References Cited

U.S. PATENT DOCUMENTS

| | | | |
|---|---|---|---|
| 4,146,382 A | | 3/1979 | Willisch |
| 4,184,602 A | * | 1/1980 | Moliard .................... 220/4.26 |
| 4,869,877 A | * | 9/1989 | Sellew et al. ............. 435/290.2 |
| 5,312,754 A | * | 5/1994 | Bryan-Brown ........... 435/286.6 |
| 5,830,358 A | * | 11/1998 | White ........................ 210/650 |
| 6,534,306 B1 | * | 3/2003 | Allen ......................... 435/266 |
| 6,627,434 B1 | * | 9/2003 | McNelly .................. 435/290.1 |

(Continued)

FOREIGN PATENT DOCUMENTS

DE    3209565    3/1983

(Continued)

OTHER PUBLICATIONS

W.L. Gore & associates GMBH "The Principle of Waste Treament with Gore Cover," http://pdf.directindustry.com/pdf/gore-electronics/the-principle-of-waste-treatment/24941-37497.html, Germany (2001).*

(Continued)

*Primary Examiner*—Walter D Griffin
*Assistant Examiner*—Shanta G Doe
(74) *Attorney, Agent, or Firm*—Grossman Tucker Perreault & Pfleger, PLLC (57) ABSTRACT

An aerobic waste treatment system, such as a composting system, comprising a movable push wall (20). The movable push wall (20) is preferably part of a container (10). In use of the aerobic waste treatment system, waste is heaped against the movable push wall (20) to build a waste heap (60). The waste is coverable with a removable flexible enclosure. The removable flexible enclosure is preferably a liquid-tight but gas-permeable cover (70). A deployment apparatus (30) for covering or uncovering the waste heap (60) with the removable flexible enclosure can facilitate the handling of the removable flexible enclosure.

20 Claims, 5 Drawing Sheets

U.S. PATENT DOCUMENTS

2002/0195781 A1* 12/2002 Jones et al. .................... 280/19
2003/0157702 A1* 8/2003 Bard ........................ 435/290.4

FOREIGN PATENT DOCUMENTS

| DE | 19724462 | 12/1998 |
|---|---|---|
| DE | 19930223 | 4/2001 |
| GB | 1427331 | 3/1976 |
| GB | 1502217 | 2/1978 |
| GB | 1597354 | 9/1981 |

OTHER PUBLICATIONS

Search Report and Written Opinion dated Jul. 9, 2004 issued in corresponding foreign patent application No. GB0406347.5.

* cited by examiner

AEROBIC WASTE TREATMENT SYSTEM

FIELD OF THE INVENTION

The invention relates to an aerobic waste treatment system.

BACKGROUND TO THE INVENTION

Composting is a type of aerobic waste treatment process. It is a process by which organic matter is broken up through micro-organisms and leads to an end product "compost" which can be used for soil improvement or as fertiliser. It is one approach to deal with organic waste accruing in households or in industrial production, e.g. meat or fish processing. Known approaches for the disposal of organic waste are waste incineration or land filling. In the past few years, the legislature has required that organic waste must be treated prior to disposal in landfills or incineration. Aerobic waste treatment systems have been known for a long time and can be found in small scale versions, e.g. as compost heaps in gardens, or as large scale industrial composting sites. The composting system can also be used to decrease the volume of waste material prior to land filling. Another type of aerobic waste treatment system involves soil remediation.

The increasing world population leads to the creation of more waste matter, including organic waste. More people require more food and there is therefore also an increasing requirement for soil improvement and fertilisers, such as compost.

Aerobic waste treatment processes such as composting, organised as businesses, need to maximise their profit. Commercial operators receive—usually from local authorities or from the waste producers themselves—their income from gate fees for disposing of the waste. The operators can also sell the end product as a fertiliser. Maximisation of their profit comes from optimising the through-put of the waste treatment process, increasing the amount of compost produced and improving the quality of the compost. This is achieved by providing the micro-organisms with the best possible environment to break down the organic waste.

For the operation of industrial aerobic waste treatment sites, both stationary and portable composting systems are known in the art. Both of these types of industrial aerobic waste treatment systems have to provide for emission reduction through minimisation of dust, bio-aerosol and odour. The industrial composting sites have to be adapted to large quantities of organic waste while keeping cost as low as possible. For economically efficient operation of the industrial composting site, the time required to set up the composting system has to be kept short. This is particularly important for trans-portable composting systems to keep the downtime of the composting system low. It is therefore desirable to provide for an easy transportation of parts and a quick set-up of the portable composting systems.

Figure 5:
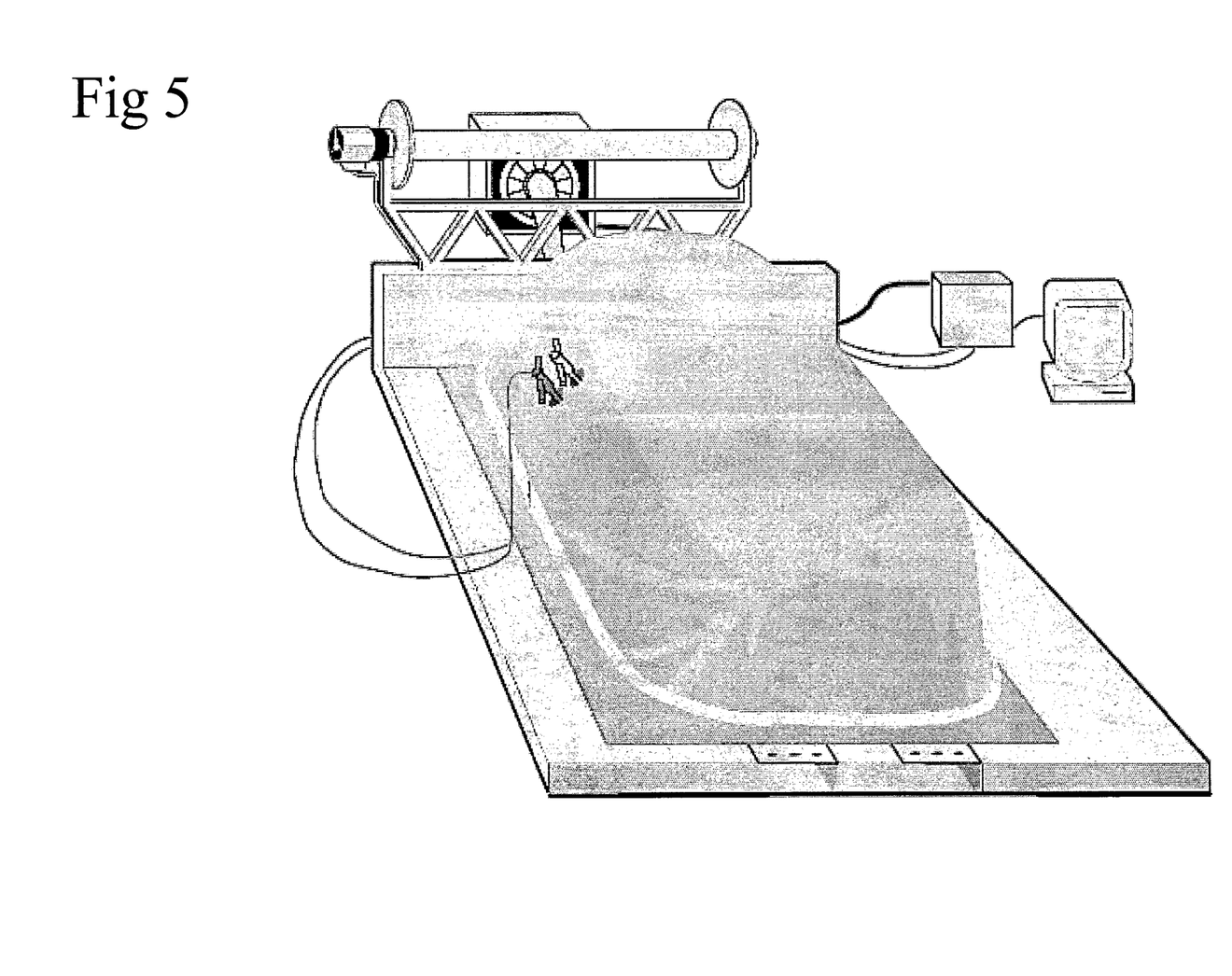
FIG. 5: A prior art composting system

Typical stationary industrial systems such as shown in FIG. 5 for outdoor composting comprise an aeration system, a control unit and a flexible (textile) enclosure. They often also comprise a massive concrete wall. A power shovel heaps organic waste against the massive concrete wall and this wall is therefore known as a "push wall". This procedure allows the efficient handling of large amounts of organic waste. Deployment mechanisms for the deployment of covers over the waste heap are often arranged on the concrete wall to provide a minimum height for the cover handling with minimum mechanical stress to the covers. The arrangement of these deployment mechanisms can be difficult and take a lot of time, particular when only limited equipment is available and when weather conditions are unfavourable. Only one side of the push wall can be used to heap the organic waste against, as ventilation and control equipment is placed on the other side of the push wall.

The push wall may also serve for other purposes not related to the heaping of the organic waste. For example, the push wall can act as a fence or screen the composting site from view.

The set-up of such a stationary composting site involves costly and time-consuming construction work, such as the preparation of foundations and concreting. There may also be a requirement to obtain planning permission from the local authority which can be time-consuming and expensive. The stationary composting site described above is obviously not portable which means that it cannot be moved from site to site as the need arises. As a result, a substantial investment in capital equipment must be made which is lost should the site be moved to other premises.

In the UK patent GB-A-1502217 an apparatus and method is taught which states that the necessary investment and the operational costs are reduced by a composting system for composting very large amounts of waste in a simple and economical manner. The composting system of the '217 patent is a stationary composting system and comprises two side walls between which the composting takes place. To access the compost there are openings from both sides of the compost heap. The compost is stacked between two parallel walls of the compost heap. The compost is positioned and taken out from the side openings. The parallel side walls do not act as walls against which the compost can be heaped with a power shovel. The composting system of the '217 patent therefore does not have a push wall.

The UK patent GB-A-1597354 deals with the problems of temperature distribution in compost heaps. There is no indication in the '354 patent that the composting system is movable. A low partition wall is, in one of the taught embodiments, an integral part of the stationary composting system of the '354 patent and thus the low partition wall is also not movable. The low partition wall separates compost in different composting states. However, the compost is heaped higher than the low partition wall and therefore the low partition wall is not a push wall. It is stated in the '354 patent that it is necessary that the free surface of the waste material is in free contact with atmospheric air, thus no cover of the waste is present.

Portable composting systems are known both as outdoor and indoor solutions. The U.S. Pat. No. 6,383,803 (portable composition system with reconfigurable air flow) describes an assembly of an air blower, a suction manifold, a discharge manifold, and ventilation (pile) manifolds which can be transported to a composting site and set up. Compost heaps can be equipped with the ventilation manifolds for a controlled aeration of the compost heaps.

Portable composting systems are also known as home appliances. The UK patent GB-A-1427331 describes such a household composting system. In the '331 patent, as normally in household composting systems, the compost is surrounded by the composting system. As the compost is usually manually deposited in the compost bin there is no need for a push wall to absorb the load of a power shovel pushing the compost against the push wall or for absorbing the load of a compost heap which is several metres high.

The heaping up of organic waste on a planar field, as shown in FIG. 1 of U.S. Pat. No. 6,383,803, is much less effective and more time-consuming than heaping the organic waste against a push wall. The use of the push wall leads to increased space efficiency (i.e. more volume of waste can be processed in the same area).

The German patent DE-C-3209565 describes a portable composting system which increases space efficiency. The compost is heaped up within three walls. The three walls comprise two parallel side walls and a front wall, together forming a U-like shape. Within the area defined by the composting system the compost is heaped up and the waste is pressed together in the composting process under the own weight of the waste. The three walls can be slid away in order to allow recovery of the waste. The described system of the '565 patent is less efficient than typical stationary composting systems as the waste has to be inserted in the composting system from the open side of the composting system. Thus the operating area for a power shovel is reduced. The described construction of the composting system of the '565 patent is a very light weight composting system, preferably made of metal grids. This construction allows pressing together of the waste under the own weight of the waste. However, such a described light-weight system is not adapted to pushing the waste in the composting system against the walls with a power shovel.

Portable composting systems can also be designed as indoor systems. To protect the environment and to provide stable process conditions the compost is processed within a closed container. A mobile modular system for composting making use of freight containers is known. The German patent DE-C-198 33 624 (processing of organic waste material) teaches an assembly of modules containing a mobile processing container. The organic waste is reduced in the container to a substrate for further processing or for deposition at a dump. The equipment for the composting process comprises a modular assembly which is used to conduct the process stages of initial aeration, anaerobic fermentation, water removal and drying within a mobile processing container. This processing container is termed a bio select percolator (BSP). The processing container comprises energy and supply facilities for the composting process. In a preferred embodiment the BSP is a modified standard 20 foot freight container. Note that although the original document says 20 inch freight container it is clear from the context that a 20 foot freight container is meant. The freight container is equipped with transport hooks, a system for active water extraction and for suction ventilation, perforated side walls, a base for a passive water extraction and a pressure ventilation system.

As the composting process is carried out within the 20 foot freight container, the system described in this German '624 patent is not adapted to large scale composting as desired in outdoor systems. The volume of organic waste composted is limited by the freight container volume. The manufacturing costs for the compost exceed the manufacturing costs for compost produced by outdoor composting systems.

The German patent applications DE-A-19724462 and DE-A19930223 also describe composting within closed containers. Therefore similar problems occur, as already described with respect to the '624 patent, such as the limited volume available for composting. It is difficult to get the waste into the container as there is only the small opening on one side. The '426 patent application teaches a second composting of already composted material. The '426 patent application suggests a high stacking of the compost outside the composting system. The stacked compost is then transported into the composting system. There is no push wall described in the '426 patent application and the compost should be stacked higher than the container for the second composting, thus needing mechanical tools for piling up the compost.

There is also no push wall described in the '233 patent application, as the described composting system is an in-vessel composting method. The '233 patent application describes a closed container. There is no clear teaching how the waste is filled into the closed container. However the description suggests filling the container from the top.

The U.S. Pat. No. 4,146,382 describes a system which forms tunnels in the compost heap to allow an improved air circulation through the compost heap. No push wall is described in the '382 patent against which waste is or could be pushed, e.g. by a power shovel. The process of heaping up the compost shows the similar inefficiencies as already discussed with respect to the '803 patent.

A way of dealing with problems arising from emissions as dust, bio-aerosols and odour in outdoor systems and also a way to provide a more stable process environment is the use of covers for covering the outdoor compost heap. By enclosing the compost with a cover a method for an outdoor in-vessel composting is provided. The covers can be air permeable or air impermeable. There are different systems known for composting which employ covers over the compost heap. For example the European patent application EP-A-0 863 856 describes a composting system having an area for containing a mass of compostable material and a weatherproof cover. The weatherproof cover can be conformable to the mass of compostable material and protects the compostable material from environmental factors. The weatherproof cover defines a composting environment in which environmental conditions may be controlled during the composting process. The weatherproof cover is air impermeable according to the description of this patent application.

In the German patent DE-C-42 31 414 an air permeable cover material for compost heaps is described. The cover described in DE-C-42 31 414 comprises an air permeable but water impermeable membrane.

No reference is made in the documents EP-A-0 863 856 and DE-C-42 31 414 to the use of a push wall which would increase the efficiency of the composting site.

One of the problems with covers for aerobic waste treatment systems is the size of the covers. Large organic waste heaps require substantial covers which can no longer be easily moved because of their weight. It is technically possible to construct a large cover out of many smaller pieces being joined together. This requires additional time and effort. Therefore large covers are preferably used for industrial aerobic waste treatment. Large covers can only be handled easily if a mechanical deployment apparatus is used. The deployment apparatus works best if placed at a level higher than the top of the waste heap as this avoids mechanical stress due to resistance between the cover and the waste heap. Therefore the deployment apparatus is mounted on the push wall against which the organic matter is heaped. A static concrete push wall cannot be moved from site to site and therefore is an unsuitable investment for temporary operations. As a result the combination of a movable push wall allowing the use of a high mounted deployment apparatus for easy handling of the large cover is an optimal technical and economically most efficient aerobic waste treatment system.

OBJECTS OF THE INVENTION

It is therefore an object of the invention to provide an easy to set up efficient aerobic waste treatment system.

It is therefore a further object of the invention to provide an efficient mobile aerobic waste treatment system.

It is therefore a further object to provide an easily transportable aerobic waste treatment system.

These and other objects are solved by providing an aerobic waste treatment system having a movable push wall. In use, the waste is heaped against this movable push wall. The waste can be covered with a removable flexible enclosure, preferably, by using an electrically driven deployment apparatus mounted on the push wall.

The use of the movable push wall in the aerobic waste treatment system allows for a space efficient operation of the site, similar to typical stationary composting sites. The movable push wall can support piles of waste stacked up high against the movable push wall. The movable push wall, which is stationary when in use in the aerobic waste treatment system, can also absorb the loads associated with a power shovel heaping and pushing the organic waste against the movable push wall. In addition the movable push wall enables the aerobic waste treatment site to be set up within a short time and so lowers the cost of ownership for the operation of the aerobic waste treatment site. This is particularly advantageous when a site has to be set up to cope with seasonal variations, e.g. during fruit picking, and avoids the investment required to set up a permanent site. It is also possible for the system of the invention to be used in areas of emergency, such as war zones or areas of humanitarian crisis, in which waste disposal systems are urgently required to reduce, stabilise and sanitise the amount of organic waste and as a result reduce the spread of epidemic diseases and infections. When the system is no longer required it can be dismantled and re-assembled elsewhere.

The aerobic waste treatment system of the current invention has further the advantage that it can be set up on a trial basis to allow an operator to test the technology without a great deal of investment. This may also be advantageous in areas in which extreme weather conditions are met and in which the system must be tested for suitability or for adjustment of the operating conditions. Moreover, transport of the waste is reduced because the aerobic waste treatment system of the current invention can be set up near the sites of waste production.

One advantage of the flexible enclosure is its flexibility regarding dimensions which can be changed, e.g. by lengthening or widening to cope with additional amounts of waste. This allows peaks in the amount of waste delivered to be catered for. It is also possible to adjust the dimensions so that different components of the waste heap are processed for different lengths of time. This is particularly useful for certain types of waste, such as grass cuttings collected during the summer period or when the composition of the waste has been changed. Finally the variation in the dimensions of the flexible cover enables different parts of the waste heap to have different additives added to ensure that the treatment process works more reliably and emissions are reduced.

The movable push wall can be realised by modular elements which can be linked together and form the push wall. This is advantageous when the amount of waste to be treated is initially unknown or fluctuates a lot due to seasonal variations (e.g. fish catch). The system of the invention can be easily expanded (or contracted) as and when required.

An easy to set up aerobic waste treatment system is also enabled by providing a container comprising a push wall and being stationary after set up of the aerobic waste treatment system. This has the advantages of both a mobile and a static system without the disadvantage of a stationary system in case of change of location.

In a preferred embodiment the movable push wall is transportable. A transportable push wall allows for an easy transport of the aerobic waste treatment system from one place to another and fast and reliably, independent from weather conditions on-site set up of the aerobic waste treatment system, as discussed above.

In a further preferred embodiment of the aerobic waste treatment system the movable push wall comprises a part or parts of one or more containers. Containers, in various forms, as elements of the push wall can help to solve different problems in setting up aerobic waste treatment sites. A push wall comprising a container does not need a strong foundation like, for example, a concrete wall. A container can act as means of transportation for parts of the aerobic waste treatment system and stay on site as push wall element later on. This is particularly useful in emergency areas when the aerobic waste treatment system has to be set up quickly. Furthermore a container can be used as service area and provide space for electrical equipment as it is part of the push wall. This protects the equipment from adverse environmental influence, theft or vandalism.

The invention furthermore discloses a process for setting up an aerobic waste treatment site by assembling the movable push wall. In a further preferred embodiment the process of setting up an aerobic waste treatment site comprises carrying equipment for the aerobic waste treatment site to the aerobic waste treatment site in one or more containers. Parts of the one or more containers can then be used as push wall for the waste heap.

DESCRIPTION OF THE DRAWINGS

FIG. 4 a) to d): Setting up of the aerobic waste treatment system

DETAILED DESCRIPTION OF THE INVENTION

Figure 1:
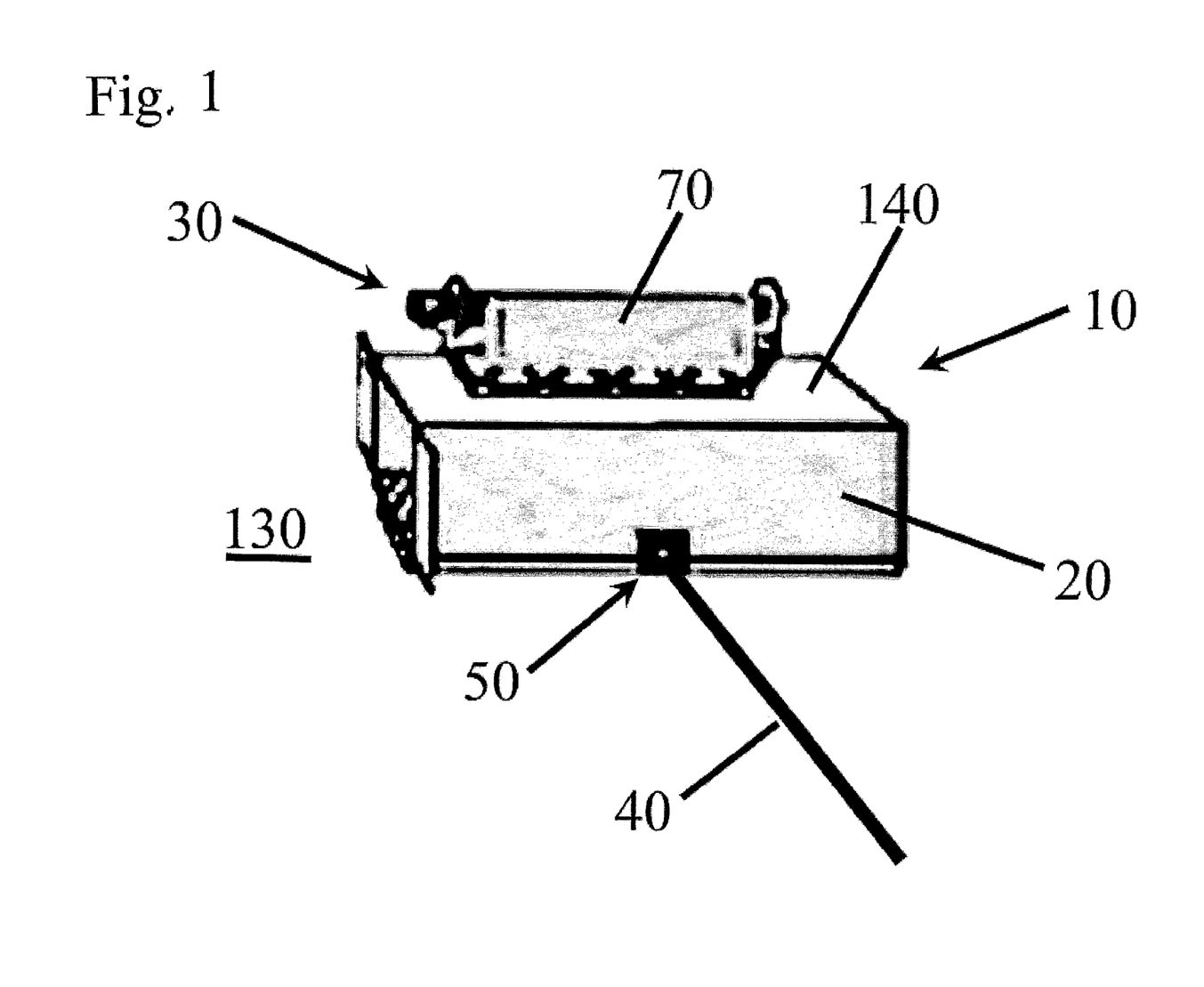
FIG. 1: Container with cover deployment apparatus and ventilation manifold

FIG. 1 shows a freight container (10) situated on a paved area (130). The freight container is preferably a 40 foot ISO freight container. A deployment apparatus (30) for a removable flexible enclosure which in this embodiment is a cover (70) is arranged on a top side (140) of the container (10). The cover (70) is preferably liquid-tight (e.g. watertight) but gas-permeable (e.g. air-permeable). One or both sidewalls of the container are reinforced by an adapted, mounted container base plate and thus form a strong push wall (20). A ventilation manifold (40) for ventilation of the waste heap is laid on the paved area (130) and connected to a ventilator (50) in the container (10). Instead of a paved area (130), a tarpaulin made, for example, from high density polyethylene or PVC can be laid on the surface of the ground. The paved area (130) could be a concrete or tarmac floor.

Containers such as typical freight containers, for example the so-called ISO containers, are a preferred building element for the push wall (20). ISO containers are standardized freight containers constructed according to any ISO standard, such as the DIN ISO 668 standard. Such containers allow for an easy handling, stacking and transportation. A preferred freight container for this invention is the 40 foot ISO container 1AAA (according to DIN ISO 668).

As discussed with respect to the prior art above, to support the mechanical load of the heaped up waste heap in the past a foundation for a narrow wall had to be built. The container with the broad container base is able to cope with such a mechanical load without preparing the foundation in advance.

The freight containers (10) are per se transportable. For transporting the components of the waste treatment system to or from the site, the freight container (10) of the invention has the advantage of being a transport unit.

In the transport unit, components such as the cover (70) and the deployment apparatus (30) can be stored.

Figure 2:
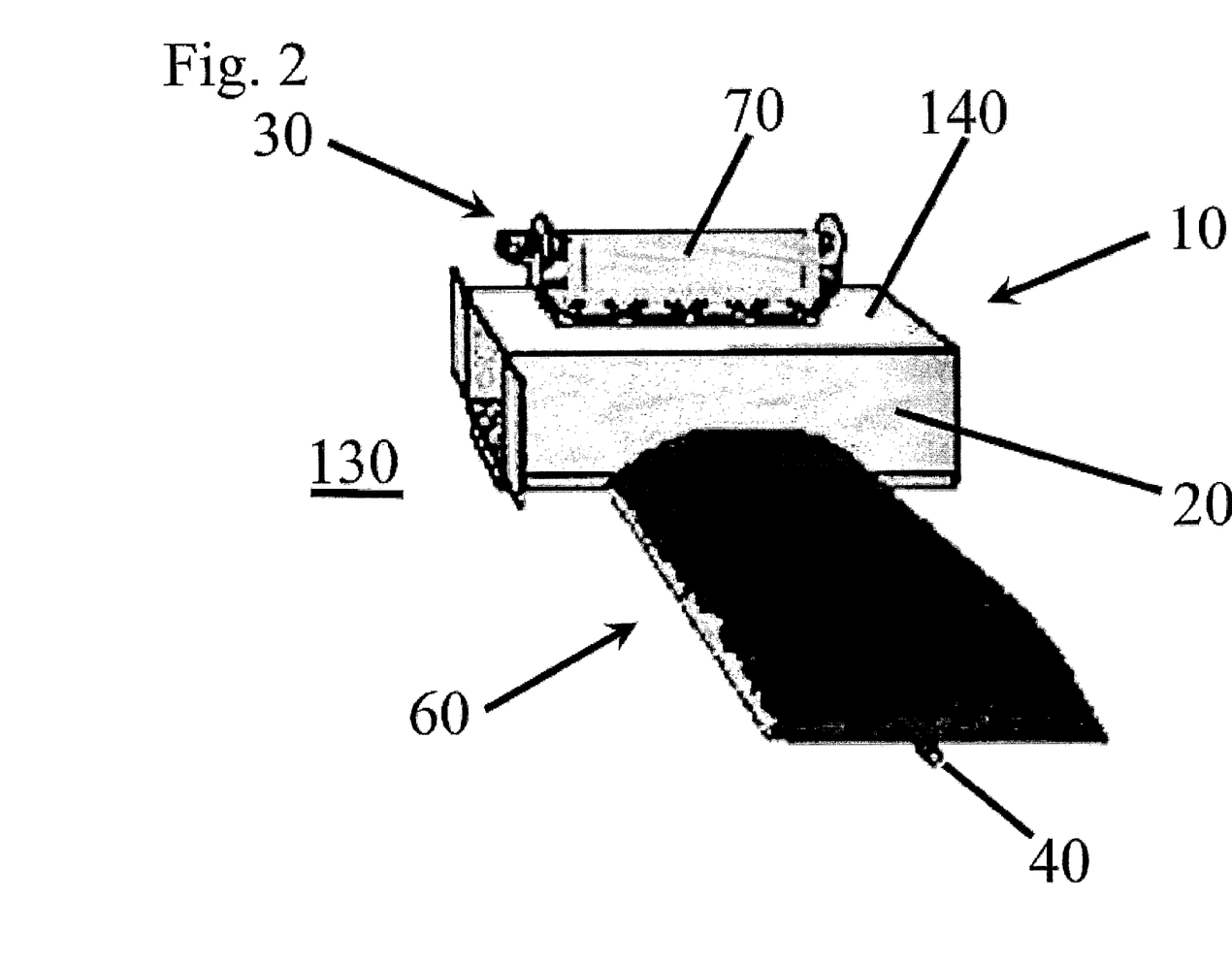
FIG. 2: Container with waste heap

FIG. 2 shows the freight container (10) of FIG. 1 of the operating aerobic waste treatment system. Waste (such as organic waste or other matter) is heaped against the push wall (20) and over the ventilation manifold (40) to form a waste heap (60). The waste heap (60) has been heaped against the push wall (20) by a power shovel. The waste heap (60) measures approximately 5 to 8 m at the base of the push wall, has a length of up to 50 m and a height of up to 2.5 m. It should be noted that the waste could also be contaminated soil collected from soil remediation projects.

In operation of the aerobic waste treatment site the freight container (10) can fulfil a variety of further purposes. The aerobic waste treatment site may need electrical equipment such as data processing equipment (shown as 100 on FIG. 3) and/or ventilation equipment (50). These types of equipment can be installed within the freight container (10) and are thus weather protected. The ventilation equipment (50) can be sound isolated in the freight container (10) to reduce noise in the environment. Installation of the equipment can be done prior to on-site installation of the freight container (10). For operation of an industrial aerobic waste treatment site it may be necessary to have a service room (80) for staff. The freight container (10) provides enough space for integrating a service room (80) for the staff.

Figure 3:
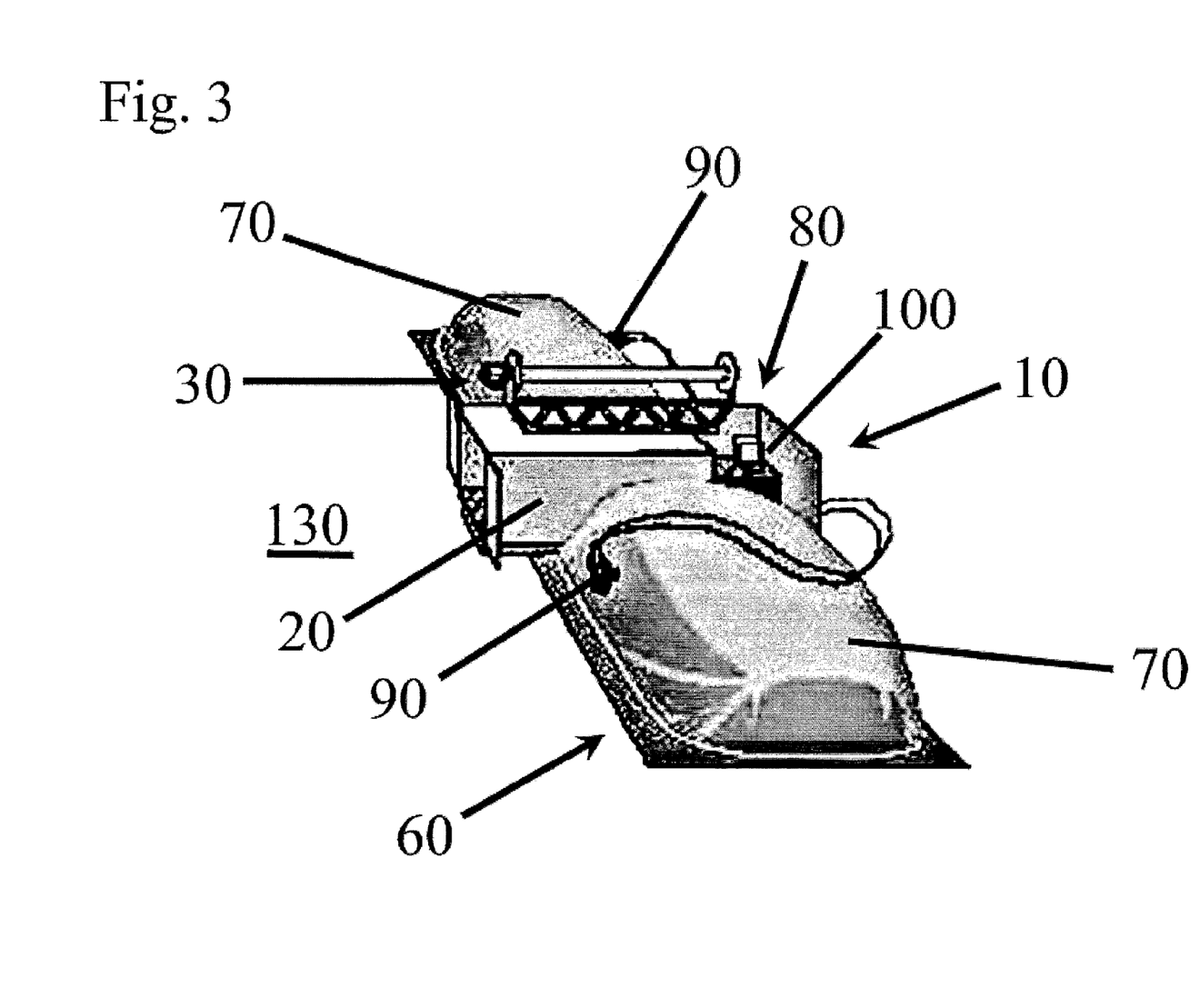
FIG. 3: The aerobic waste treatment system

Electrical equipment is installed within the freight container (10) as shown in FIG. 3, including a switch cabinet, not shown in the figure, with fuses and terminal blocks. There is data processing equipment (100) such as computers analog/digital and digital/analog converters and there are controllers also present within the freight container (10). A generator and/or solar cell panels (not shown in the figure) can also be provided to ensure that the waste treatment process can operate independently of mains electricity. An area of the freight container (10) is a service room (80) for staff. This service room (80) is equipped with a desk and a chair and is also heatable. The freight container (10) has a compartment for the ventilator shown in FIG. 1 which is built in a sound insulating manner. All this equipment has been installed in the freight container (10) prior to transporting the freight container (10) to the paved area (130).

The waste heap (60) in FIG. 3 is covered with the cover (70) which is gas permeable and/or liquid proof and air is blown into the waste heap (60) by the ventilator (50). Air can be blown into the waste heap (60) either by laying ventilation pipes onto the paved area (130) or by using pre-installed ventilation channels laid into the floor. Testing probes (90) for parameters, such as oxygen content, temperature and humidity, are inserted into the waste heap (60). The testing probes (90) deliver testing probe data for the oxygen content, the temperature and the humidity in the waste heap (60). The data processing equipment (100) monitors and controls the aerobic waste treatment process by processing the testing probe data. The edges of the cover (70) are held down using a hose, such as a fire hose, which has been filled with water or a frost resistant liquid and which is attached to grips at the rim of the cover to prevent its rolling.

After completion of the aerobic waste treatment process, which can be assessed by the testing probe data monitored and recorded with the data processing equipment (100), the cover (70) is coiled up by the deployment apparatus (30). The coiling up can be done with the help of an electric motor and the compost can be subsequently further processed.

During transport of the aerobic waste treatment system the deployment apparatus (30) for the cover (70) and the cover (70) itself have been fixed in the freight container (10) with specially adapted mountings. The adapted base plate has been fixed already on one or both sides (20) of the freight container (10).

Figure 4:
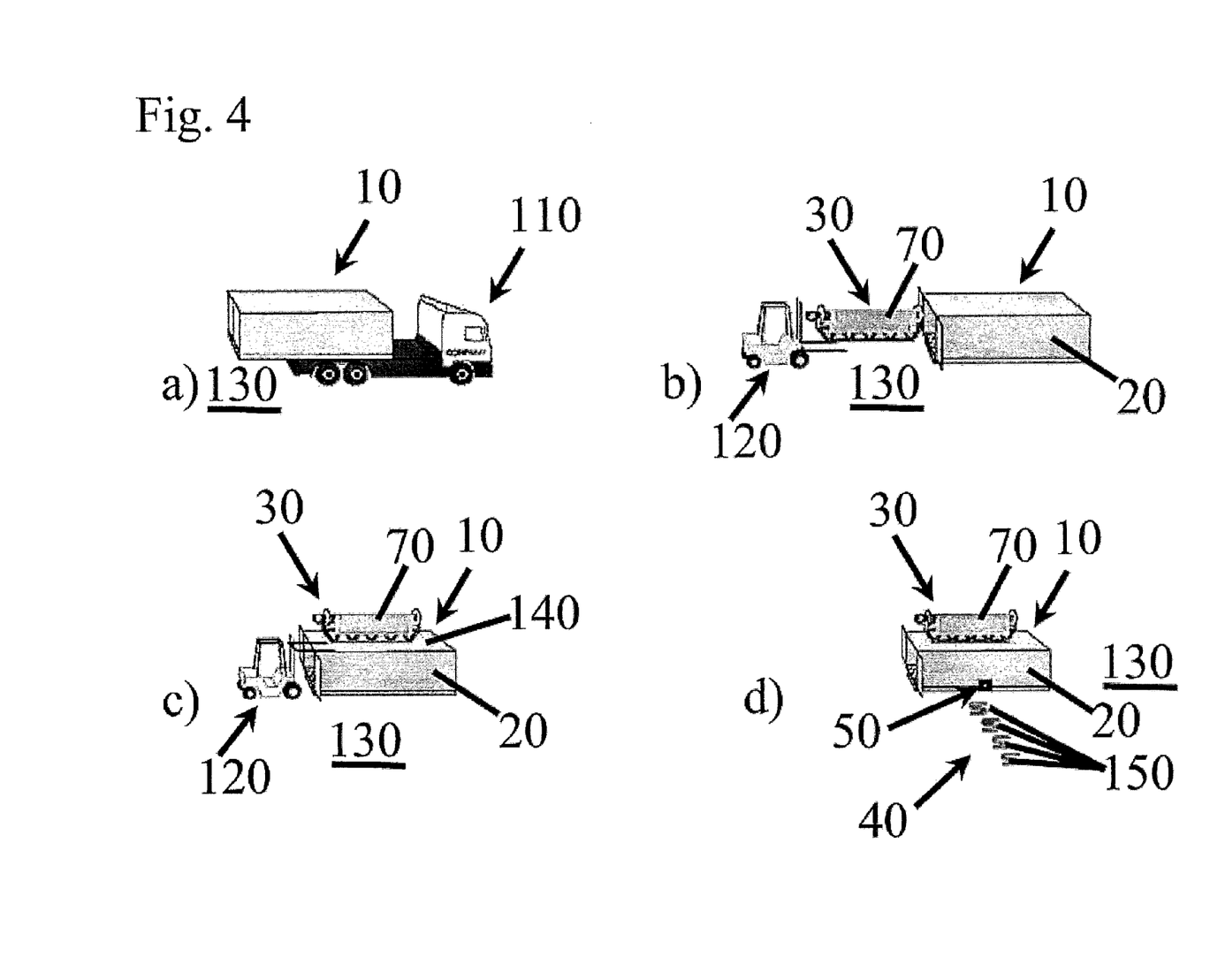

FIG. 4 shows the main stages of setting up the new aerobic waste treatment site. In FIG. 4 a) the freight container (10), which has been carried by a freight vehicle (110), is placed—if necessary using a crane—on an area, such as the paved area (130). Equipment such as the switch cabinet, the ventilation equipment (50) and the data processing equipment (100) has been pre-installed in the container (10) on a manufacturing site for preassembling the freight container (10). This occurs before the freight container (10) is transported to the aerobic waste treatment site. Further equipment such as the ventilation manifold (40) and the deployment apparatus (30) for the cover (70) have been transported to the aerobic waste treatment site in the freight container (10). FIG. 4 b) shows the removal of the deployment apparatus (30) from the freight container (10) by a fork lift (120). In FIG. 4 c) the deployment apparatus (30) is lifted by the fork lift (120) onto the top side (140) of the freight container (10) and can then be fixed on the freight container (10) by use of pre-installed rails or frame. FIG. 4 d) shows the assembly of the ventilation manifold (40). The ventilation manifold (40) can be transported in the freight container (10) disassembled in parts (150), thereby fitting in the freight container (10). The disassembled parts (150) of the ventilation manifold (40) are removed from the freight container (10), distributed on the paved area (130), reconnected to each other and connected to the ventilator (50).

LIST OF REFERENCE NUMBERS

| | |
|---|---|
| 10 | Container |
| 20 | Push wall |
| 30 | Deployment apparatus |
| 40 | Ventilation manifold |
| 50 | Ventilator |
| 60 | Waste heap |
| 70 | Cover |
| 80 | Service room |
| 90 | Testing probes |
| 100 | Data processing equipment |
| 110 | Truck |
| 120 | Fork lift |
| 130 | Paved area |
| 140 | Top side of the container |
| 150 | Disjointed parts of the ventilation manifold |

The invention claimed is:

1. Aerobic waste treatment system comprising a push wall against which, in use, waste can be heaped in a stationary manner, an aeration system for providing ventilated air to the waste, electrical equipment including a control unit for controlling an aerobic waste treatment process and a deployment apparatus for covering the waste with a removable flexible enclosure, characterised by a container, which container at its outside comprises the push wall.

2. Aerobic waste treatment system according to claim 1, in which at least one long side of the container is equipped with the push wall.

3. Aerobic waste treatment system according to claim 1, in which the push wall comprises at least part of a reinforced wall of the container.

4. Aerobic waste treatment system according to claim 1, in which at least part of the aeration system, the electrical equipment, and the control unit are arranged inside the container.

5. Aerobic waste treatment system according to claim 4, in which the container is adapted to house and transport the aeration system, the electrical equipment, the control unit, the deployment apparatus with the removable flexible enclosure and the push wall.

6. Aerobic waste treatment system according to claim 1, in which the container comprises at least one connector for a ventilation manifold.

7. Aerobic waste treatment system according to claim 1, in which the container comprises an independent electrical power source.

8. Aerobic waste treatment system according to claim 1, in which the container houses a service area.

9. Aerobic waste treatment system according to claim 1, in which the container is an ISO container.

10. Aerobic waste treatment system according to claim 1, in which the removable flexible enclosure is a liquid tight and/or gas-permeable cover.

11. Aerobic waste treatment system according to claim 1, in which the system further comprises a substantially impermeable surface on which the waste can be heaped against the push wall.

12. Aerobic waste treatment system according to claim 11 wherein the substantially impermeable surface includes a tarpaulin.

13. Aerobic waste treatment system according to claim 1, in which the deployment apparatus with the removable flexible enclosure is arranged at the top of the container.

14. Aerobic waste treatment system according to claim 1, in which the push wall and the container are transportable.

15. Aerobic waste treatment system according to claim 1, in which the push wall and the container are modularly expandable by linking the push wall and the container together, respectively.

16. Aerobic waste treatment system according to claim 14 in which the container is an ISO container.

17. A method of setting up and operating an aerobic waste treatment system comprising:
    arranging a container on a substantially impermeable surface;
    mounting a push wall externally to the container;
    arranging a ventilation manifold on the substantially impermeable surface;
    connecting the ventilation manifold with a ventilator inside the container;
    mounting a deployment apparatus with a removable flexible enclosure at the top of the container;
    heaping and stacking up waste on the substantially impermeable surface against the push wall to form a waste heap; and
    covering the waste heap with the removable flexible enclosure.

18. The method according to claim 17, further comprising:
    weighing down the edges of the removable flexible enclosure on the substantially impermeable surface.

19. The method according to claim 17, further comprising:
    inserting testing probes into the waste heap.

20. The method according to claim 17, in which the substantially impermeable surface is provided by laying a tarpaulin on the surface of the ground.

* * * * *